(12) United States Patent
Sakiyama

(10) Patent No.: US 12,733,630 B2
(45) Date of Patent: Sep. 15, 2026

(54) DOUBLE-BEARING REEL

(71) Applicant: GLOBERIDE, Inc., Higashikurume (JP)

(72) Inventor: Tomoaki Sakiyama, Higashikurume (JP)

(73) Assignee: GLOBERIDE, Inc., Tokyo (JP)

( * ) Notice: Subject to any disclaimer, the term of this patent is extended or adjusted under 35 U.S.C. 154(b) by 170 days.

(21) Appl. No.: 18/762,986

(22) Filed: Jul. 3, 2024

(65) Prior Publication Data

US 2025/0127153 A1 Apr. 24, 2025

(30) Foreign Application Priority Data

Oct. 24, 2023 (JP) ................................ 2023-182212

(51) Int. Cl.
*A01K 89/015* (2006.01)

(52) U.S. Cl.
CPC .... *A01K 89/0193* (2015.05); *A01K 89/01921* (2015.05)

(58) Field of Classification Search
CPC .......... A01K 89/0155; A01K 89/01921; A01K 89/01922; A01K 89/01923
See application file for complete search history.

(56) References Cited

U.S. PATENT DOCUMENTS

2019/0141972 A1* 5/2019 Oogose .............. A01K 89/0193 242/314
2019/0191683 A1 6/2019 Niitsuma
2023/0172180 A1* 6/2023 Jo .......................... A01K 89/01 242/223

FOREIGN PATENT DOCUMENTS

| | | | | |
|---|---|---|---|---|
| CN | 110012884 A | | 7/2019 | |
| CN | 209882856 U | | 1/2020 | |
| CN | 112400867 A | | 2/2021 | |
| JP | 2018110566 A | * | 7/2018 | |
| JP | 2022-094071 A | | 6/2022 | |
| KR | 20170084999 A | * | 7/2017 | ........... A01K 89/006 |

OTHER PUBLICATIONS

May 8, 2026 Office Action issued in Chinese Application No. 202411313028.0.

* cited by examiner

*Primary Examiner* — Michael Mccullough
(74) *Attorney, Agent, or Firm* — Oliff PLC

(57) ABSTRACT

A double-bearing reel of the present invention comprises a reel main body provided with an opening and closing mechanism that allows a side plate to be opened and closed with respect to a frame. The opening and closing mechanism comprises an opening and closing lever that is supported by the frame in a displaceable manner and comprises an operating part exposed from the reel main body and a locking portion, and an engaging portion provided on the side plate and engageable with and disengageable from the locking portion when the opening and closing lever is displaced by an operation of the operating part.

5 Claims, 6 Drawing Sheets

DOUBLE-BEARING REEL

CROSS-REFERENCE TO RELATED APPLICATION

This application claims priority under 35 U.S.C. § 119 to Japanese Patent Application No. 2023-182212 filed on Oct. 24, 2023 in the Japanese Patent Office, the entire contents of each hereby incorporated by reference.

BACKGROUND OF THE INVENTION

1. Technical Field

The present invention relates to a double-bearing reel in which a spool around which a fishing line is wound is rotatably supported between side plates of a reel main body, and relates more specifically to a double-bearing reel comprising an opening and closing mechanism that enables the side plates to be attached to and detached from a frame.

2. Description of the Related Art

In general, double-bearing reels are configured so that side plates (side plates) are mounted on the left and right sides of the frame, respectively, and the spool is rotatably supported between the left and right side plates. Further, the double-bearing reel is provided with an opening and closing mechanism that enables the side plates to be removed from the frame because it is necessary to attach and detach the spool and to maintain various functional components, and the like.

As an opening and closing mechanism for attaching and detaching a side plate to and from the frame, for example, a configuration disclosed in JP 2022-94071 A is known. The opening and closing mechanism disclosed in JP 2022-94071 A is configured so that a rotation ring rotatably supported is provided on a set plate installed inside of the side plate, and a locked state between a frame and the side plate is released by rotating the rotation ring. The rotation ring is provided with an operating part protruding radially outward from the side plate (reel main body), and the locked state can be released by operating the operating part in a circumferential direction.

SUMMARY OF THE INVENTION

In the opening and closing mechanism disclosed in JP 2022-94071 A described above, since the rotation ring is disposed on the side plate side, the side plate is thickened accordingly. For this reason, since the size of the side plate increases and the gripping property also decreases, there is room for improvement of the opening and closing mechanism. Further, since the rotation ring is covered with the set plate, there is room for improvement in maintainability.

The present invention has been made in view of the above problems, and an object thereof is to provide a double-bearing reel having an opening and closing mechanism that allows reducing the size of a side plate and improving the gripping property, and has good maintainability.

In order to achieve the above object, a double-bearing reel according to the present invention comprises a reel main body provided with an opening and closing mechanism that allows a side plate to be opened and closed with respect to a frame, in which the opening and closing mechanism comprises a moving member that is supported by the frame in a displaceable manner and comprises an operating part exposed from the reel main body and a locking portion, and an engaging portion provided on the side plate and engageable with and disengageable from the locking portion when the moving member is displaced by an operation of the operating part.

In the double-bearing reel having the above-described configuration, regarding the opening and closing mechanism for opening and closing the side plate with respect to the frame, the moving member having the operating part and the locking portion is provided on the frame side, and the engaging portion to be engaged with the locking portion is provided on the side plate side. Therefore, a space for assembling the moving member in the side plate can be omitted. Thus, the thickness of the side plate can be reduced, and downsizing and improvement in grasping property can be achieved. Further, when the side plate is removed from the frame by the opening and closing mechanism, the moving member is exposed, so that maintainability can be improved.

Advantageous Effects of Invention

According to the present invention, it is possible to reduce the size of a side plate and improve a gripping property, and it is possible to obtain a double-bearing reel comprising an opening and closing mechanism with good maintainability.

BRIEF DESCRIPTION OF THE DRAWINGS

FIGS. 5A and 5B are views illustrating an internal structure of the side plate on the side opposite to the handle, in which FIG. 5A is a perspective view and FIG. 5B is a front view; and FIGS. 6A and 6B are views illustrating a state in which the side plate on the side opposite to the handle is removed, in which FIG. 6A is a view illustrating a locked state and FIG. 6B is a view illustrating an unlocked state.

DETAILED DESCRIPTION

Figure 1:
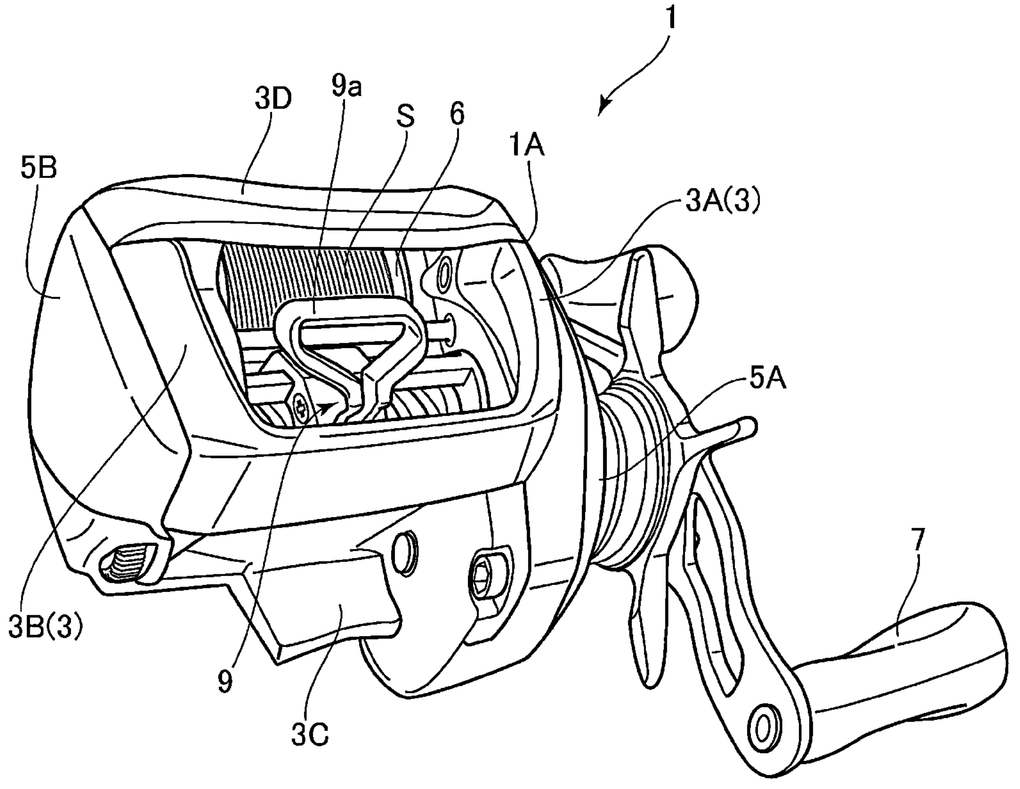
FIG. 1 is a perspective view of an embodiment of a double-bearing reel according to the present invention as viewed from a front side.
Figure 2:
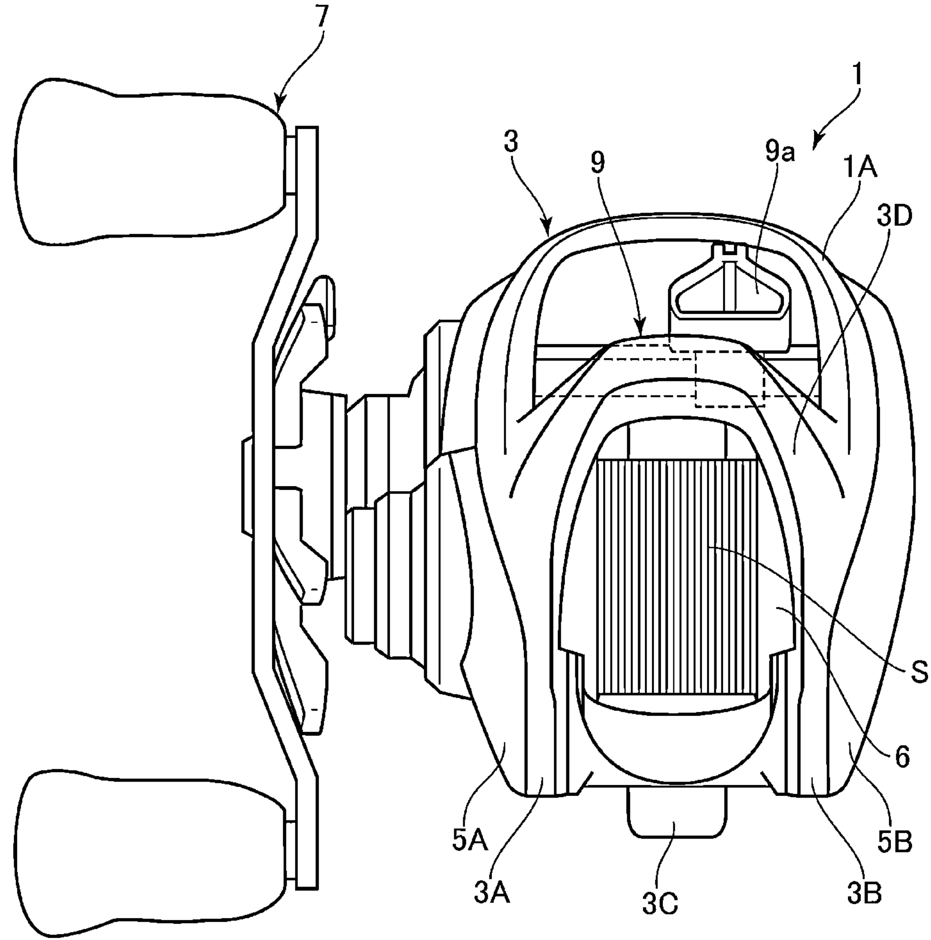
FIG. 2 is a plan view of a double-bearing reel illustrated in FIG. 1.
Figure 3:
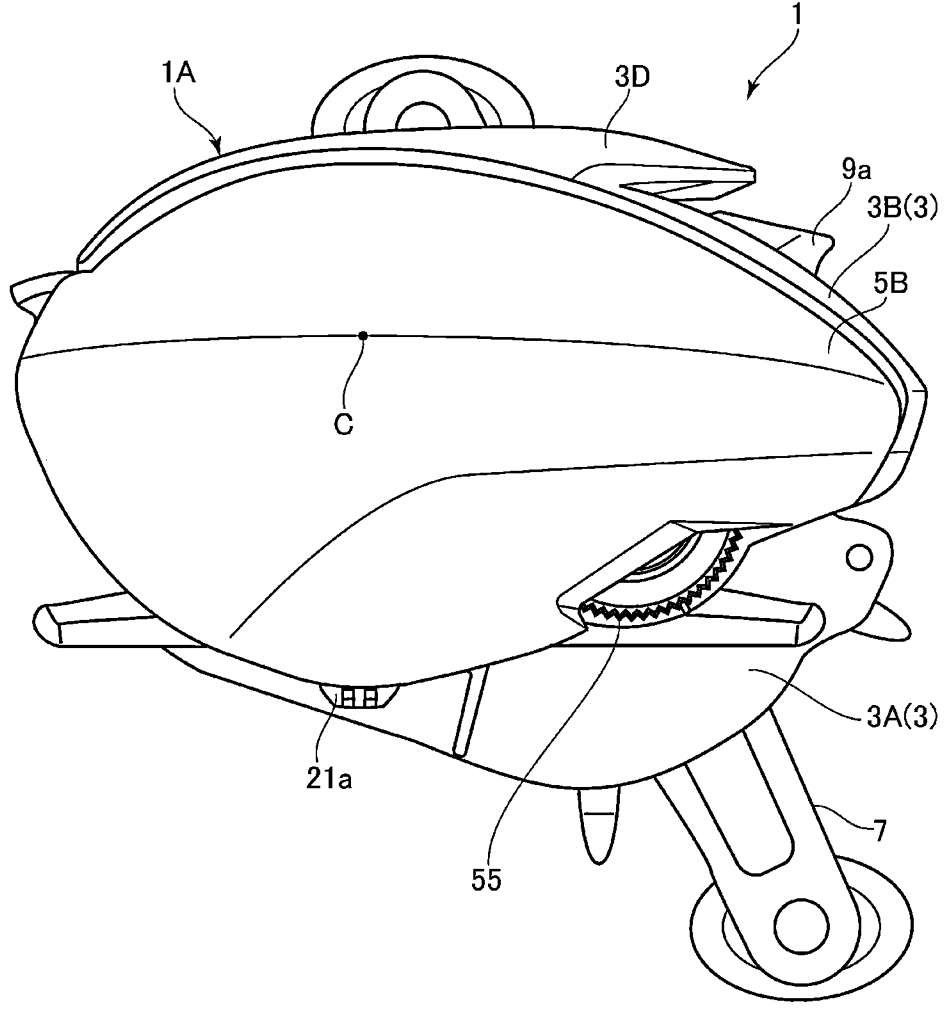
FIG. 3 is a side view of the double-bearing reel illustrated in FIG. 1 as viewed from a side opposite to the handle (locked state of an opening and closing mechanism)

First, an overall configuration of an embodiment of a double-bearing reel 1 according to the present invention will be described with reference to FIGS. 1 to 3. The reel main body 1A of the double-bearing reel 1 according to the present embodiment comprises left and right side plates (covers) 5A and 5B attached so as to cover side portions (left and right side portions 3A and 3B) of a frame 3 integrally formed in a predetermined shape. The left and right side plates 5A and 5B of the present embodiment are formed in a substantially elliptical shape in a side view, and a spool 6 around which a fishing line S is wound is rotatably supported between the left and right side plates.

A handle 7 for rotationally driving the spool 6 is provided on one of the left and right side plates (the left side plate 5A side in the present embodiment), and a rotational driving force of the handle 7 is transmitted to the spool 6 by a known power transmission mechanism disposed in an internal space between the left side plate 5A and the left side portion 3A of the frame 3. Note that the handle 7 may be provided on the right side plate 5B side.

Furthermore, a known level wind mechanism 9 comprising a fishing line guide part 9*a* for guiding a fishing line is provided in front of the spool 6 between the left and right side plates, and the fishing line guide part 9*a* is reciprocated left and right in front of the spool 6 via the power transmission mechanism. Thus, when the handle 7 is wound, the fishing line is evenly wound around the spool 6 via the fishing line guide part 9*a* that reciprocates left and right.

The frame 3 is integrally formed with the left and right side portions 3A and 3B, the left side plate 5A is attached to the left side portion 3A, and the right side plate 5B is attached to the right side portion 3B. Further, in the frame 3, a connecting portion that connects the left side portion 3A and the right side portion 3B is formed. The connecting portions may be formed at a plurality of places, and are provided, for example, on a front side, a rear side, an upper side, and a lower side of the spool 6. Note that these connecting portions may be covered with an appearance member such as metal as necessary.

A reel leg 3C to be attached to a reel sheet of a fishing rod is integrally formed in a lower connection portion provided below the spool 6 among connection portions (reel leg 3C may be integrally formed with the frame 3). Further, a coupling portion 3D on the upper side of the spool 6 may have a function as a thumb rest on which a finger can be placed when the reel main body 1A is grasped and held.

The shapes of the left and right side portions 3A and 3B of the frame 3 and the left and right side plates 5A and 5B attached thereto are not limited. In the present embodiment, the outer peripheral shape is formed in a non-circular shape (substantially elliptical shape) extending in the front-back direction in a side view (see FIG. 3). In this case, since a drive gear is mounted on the side where the handle 7 is provided (the left side portion 3A of the frame 3 and the left side plate 5A), the shape of the side where the handle 7 is provided may be different from the shape of the right side portion 3B of the frame 3 and the right side plate 5B so as to ensure a housing portion thereof.

Further, a circular opening (circular opening) is formed in one of the left and right side portions 3A and 3B of the frame 3 so that the spool 6 can be inserted and removed along an axial direction. In the present embodiment, since the right side plate 5B has a structure detachable from the frame 3 by the following opening and closing mechanism, the circular opening is formed in the right side portion 3B of the frame 3.

The opening and closing mechanism is configured to open and close (attach and detach) the side plate to and from the frame 3 so that the spool 6 can be attached and detached, or maintenance of various functional components, or the like can be performed, and in the present embodiment, the right side plate 5B that is a side opposite to the handle can be attached and detached from the right side portion 3B of the frame 3.

Hereinafter, an opening and closing mechanism 20 of the present embodiment will be described with reference to FIGS. 4 to 6. The opening and closing mechanism 20 is supported by the frame 3 (right side portion 3B) in a displaceable manner, and comprises an operating part 21*a* exposed from the reel main body 1A and a moving member 21 comprising locking portions 21*b*. The moving member 21 only needs to be movably held by the frame 3, and is moved by operating the operating part 21*a*. Further, the opening and closing mechanism 20 comprises engaging portions 23 provided on the right side plate 5B and engageable with the locking portions 21*b* when the moving member 21 is displaced by the operation of the operating part 21*a*.

That is, when the operating part 21*a* is operated to move the moving member 21 and the locking portions 21*b* and the engaging portions 23 are engaged with each other, the locked state is established, and when the operating part 21*a* is operated to move the moving member 21 and the locking portions 21*b* and the engaging portions 23 are disengaged, the unlocked state is established.

The moving member 21 is movably held along a surface of the right side portion 3B of the frame 3. In this case, it is preferable that the moving member 21 comprises an arc-shaped portion so that efficiency of a moving space can be improved and the locking portions 21*b* and the engaging portions 23 can be stably engaged and disengaged. In addition, the locking portions 21*b* are preferably provided on the inner side (radially inner side) of the arc-shaped portion so that the locking portions 21*b* and the engaging portions 23 do not increase in diameter or thickness in the axial direction.

The moving member 21 of the present embodiment is formed in a ring shape formed in the right side portion 3B of the frame 3 and disposed along a periphery of a circular opening 3E through which the spool 6 is inserted (hereinafter, the moving member 21 formed in a ring shape is also referred to as an "opening and closing lever 21"). The opening 3E is formed substantially equal to the diameter of a flange of the spool 6, and in FIG. 4, an opening edge of the circular opening 3E overlaps the inner edge 21A of the opening and closing lever 21.

In the opening and closing lever 21, the locking portions 21*b* are integrally formed on an inner surface side (inner side edge 21A) in a radial direction so as to protrude toward the center. The number of the locking portions 21*b* formed is not limited, but in the configuration illustrated in FIG. 4, three locking portions are formed at intervals of approximately 120°. Further, the operating part 21*a* is integrally formed on an outer surface side of the opening and closing lever 21 in the radial direction so as to protrude radially outward.

The operating part 21*a* protrudes from the reel main body 1A and is disposed so as to be slidable with a finger. Thus, a notch 24 is formed at a position where the right side portion 3B of the frame 3 and the right side plate 5B face each other, and the operating part 21*a* is provided so as to protrude to the outside from the notch 24. In this case, the notch 24 is formed on the outer surface of the right side portion 3B of the frame, and is preferably formed at a position where a finger does not touch during normal use of the reel, for example, at the lower end of the reel main body 1A.

A set plate 30 is attached inside of the right side plate 5B. The set plate 30 of the present embodiment is formed in a substantially cylindrical shape, and is fixed to the inner surface of the side plate 5B with a screw 32 (or a plurality of screws). Further, an outer peripheral surface 30*a* of the set plate 30 is substantially flush with an outer peripheral surface of the flange of the spool 6 and is inserted into the circular opening 3E of the frame 3.

An annular boss 30*b* for bearing support is formed in a central region of the set plate 30. In the internal space of the boss 30*b*, a bearing 60 (see FIGS. 6A and 6B) that supports the end of the drive shaft of the spool 6 is disposed, and retained by a retaining member (not illustrated) in the axial direction.

Further, a known backlash preventing device (magnet brake device) is held on the outer peripheral side of the boss 30*b*. The backlash preventing device comprises ring magnets 50 and 51 arranged concentrically, the inner ring magnet 50 is fixed to an outer peripheral wall of the boss 30*b*, and the outer ring magnet 51 is rotatably supported with respect to the set plate 30.

The ring magnet 51 is supported by a support portion 53 rotatably supported by the set plate 30, and a tooth portion (not illustrated) formed in the support portion 53 meshes with a tooth portion 55*a* of an adjustment dial 55 rotatably supported by the set plate 30. A part of the adjustment dial 55 is exposed from the lower side of the right side plate 5B, and when the adjustment dial 55 is rotated, the ring magnet 51 is rotatable by the meshing relationship between the tooth portions.

Further, an annular conductor (not illustrated) provided on one side surface of the spool 6 is located between the ring magnets 50 and 51 when the right side plate 5B is attached to the right side portion 3B of the frame 3. When the position of the outer ring magnet 51 is changed by rotationally operating the adjustment dial 55 in this state, the magnetic flux between the ring magnets 50 and 51 changes, and the magnetic force acting on the annular conductor (the braking force on the spool) is adjusted.

Figure 5A:
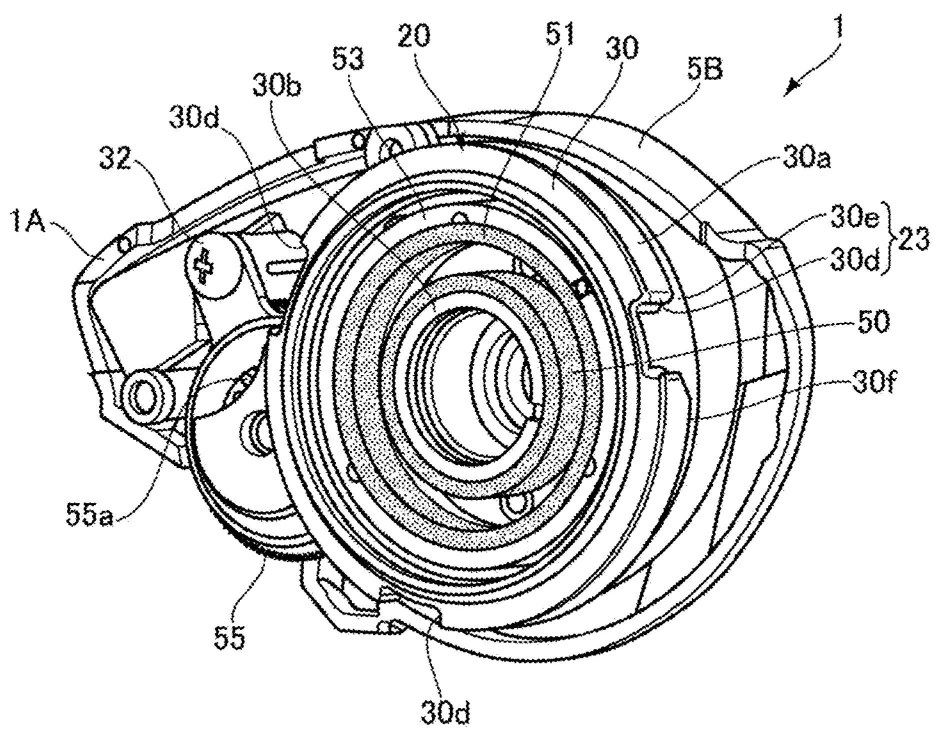

As described above, the set plate 30 is formed in a substantially cylindrical shape, and the three engaging portions 23 to be engaged with and disengaged from the three locking portions 21*b* of the opening and closing lever 21 are formed on the outer peripheral surface 30*a* thereof. Here, the locking portions 21*b* and the engaging portions 23, which are components of the opening and closing mechanism 20 in the present embodiment, will be described. Note that FIGS. 6A and 6B illustrate the positional relationship of the opening and closing lever 21 disposed along the periphery of the opening 3E of the frame 3 (right side portion 3B) in addition to the side plate 5B illustrated in FIGS. 5A and 5B.

The right side plate 5B is attached to the frame 3 (right side portion 3B) in the axial direction in an aligned state. Therefore, the position of the locking portions 21*b* formed on the opening and closing lever 21 are aligned with the three engaging portions 23 formed on the outer peripheral surface 30*a* of the set plate 30. That is, the engaging portions 23 are formed on the outer peripheral surface 30*a* of the set plate 30 at positions where the locking portions 21*b* enter.

The engaging portions 23 of the present embodiment comprise, on the outer peripheral surface 30*a* of the set plate 30, notches 30*d* formed at intervals of approximately 120°, and an annular groove 30*e* formed on the outer side in the axial direction and having a groove width with which the locking portions 21*b* can move in the circumferential direction.

An operation of the opening and closing mechanism 20 configured as described above will be described. FIG. 6A illustrates the inner surface side of the right side plate 5B in a state where the right side plate 5B is attached to the right side portion 3B of the frame 3 (locked state). At this time, each locking portion 21*b* of the opening and closing lever 21 is fitted into the annular groove 30*e* of the set plate 30, and each locking portion 21*b* is regulated by a wall portion 30*f* of the annular groove 30*e* and is fixed to the right side portion 3B of the frame 3 (locked state). As described above, the locking portions 21*b* are fitted into the annular groove 30*e*, so that the locked state is ensured, and the right side plate 5B is not detached.

When the operating part 21*a* is pinched and moved to the rear side of the reel main body from the state illustrated in FIG. 6A, as illustrated in FIG. 6B, the locking portions 21*b* of the opening and closing lever 21 are located in the respective notches 30*d* of the set plate 30. At this time, the right side plate 5B is detachable from the right side portion 3B of the frame 3 (unlocked state). Thus, the side plate 5B can be pinched and moved in the axial direction, and the right side plate 5B can be detached from the frame 3 and the spool 6 can be detached from the opening 3E of the frame 3.

Figure 4:
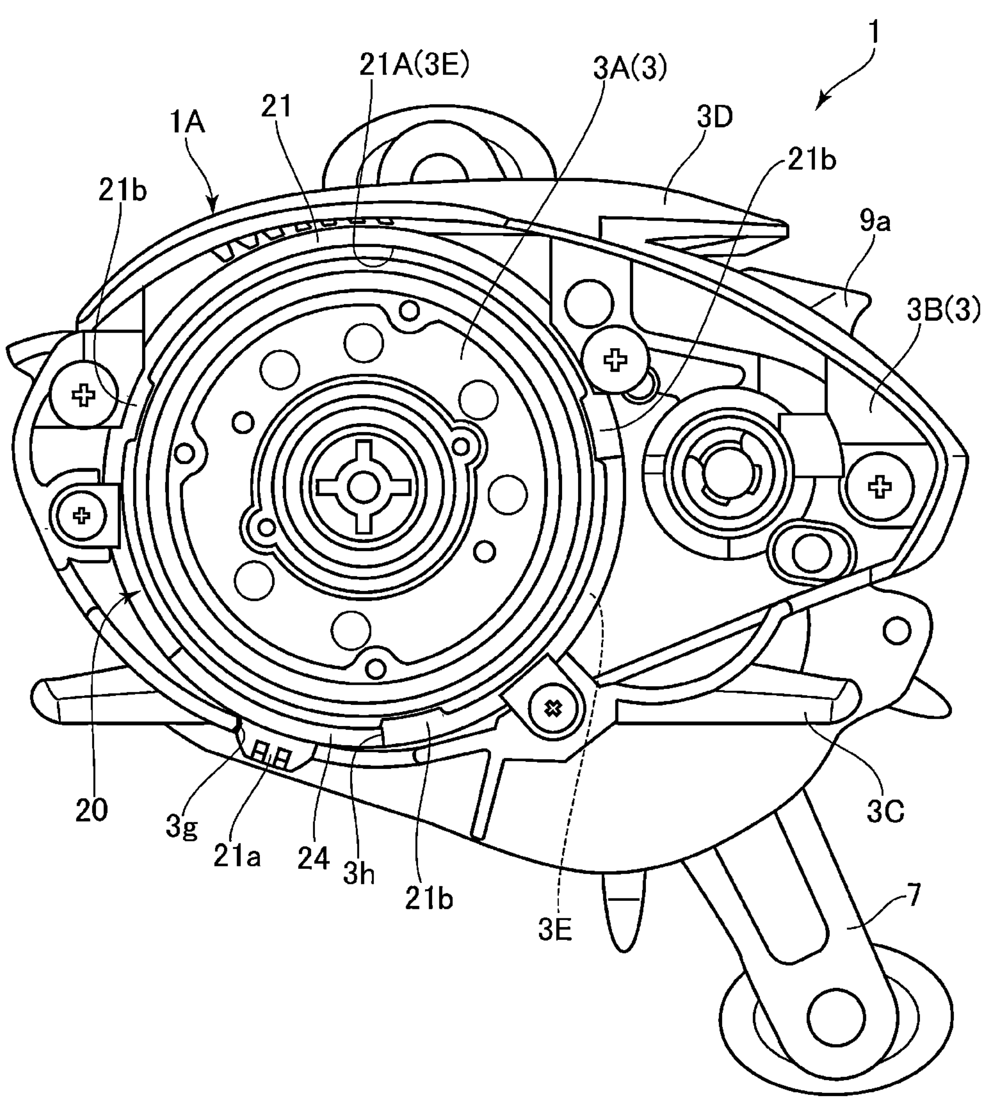
FIG. 4 is a side view illustrating a state in which a side plate on the side opposite to the handle is removed (the opening and closing mechanism is in an unlocked state)

It is preferable that the frame 3 is provided with positioning portions 3*g* and 3*h* that restrict the rotation position of the operating part 21*a* of the opening and closing lever 21 (see FIG. 4). Thus, the rotation of the opening and closing lever 21 can be stopped at the position in the unlocked state where the engagement is released and the position in the locked state where the engagement is made.

Note that, when the right side plate 5B is attached to the frame 3, the right side plate 5B is aligned and integrated with the right side portion 3B of the frame 3 when the operating part 21*a* of the opening and closing lever 21 is at the position illustrated in FIG. 6B. Then, in this state, by operating the operating part 21*a* to the position illustrated in FIG. 6A, the locked state can be established.

According to the above configuration, since the opening and closing lever 21 of the opening and closing mechanism 20 is provided on the right side portion 3B of the frame 3, a space for assembling the opening and closing lever to the right side plate 5B can be omitted. Thus, the right side plate 5B can be thinned or thickened, and downsizing and improvement in grasping property can be achieved.

Figure 5B:
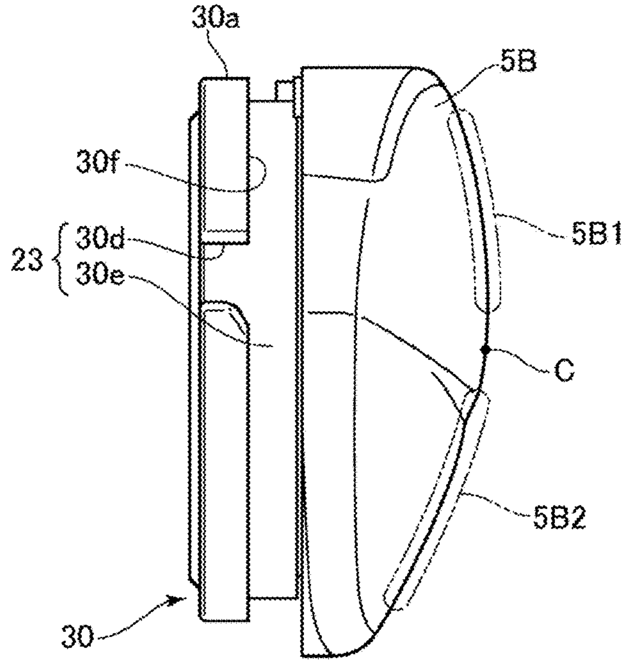
Figure 6A:
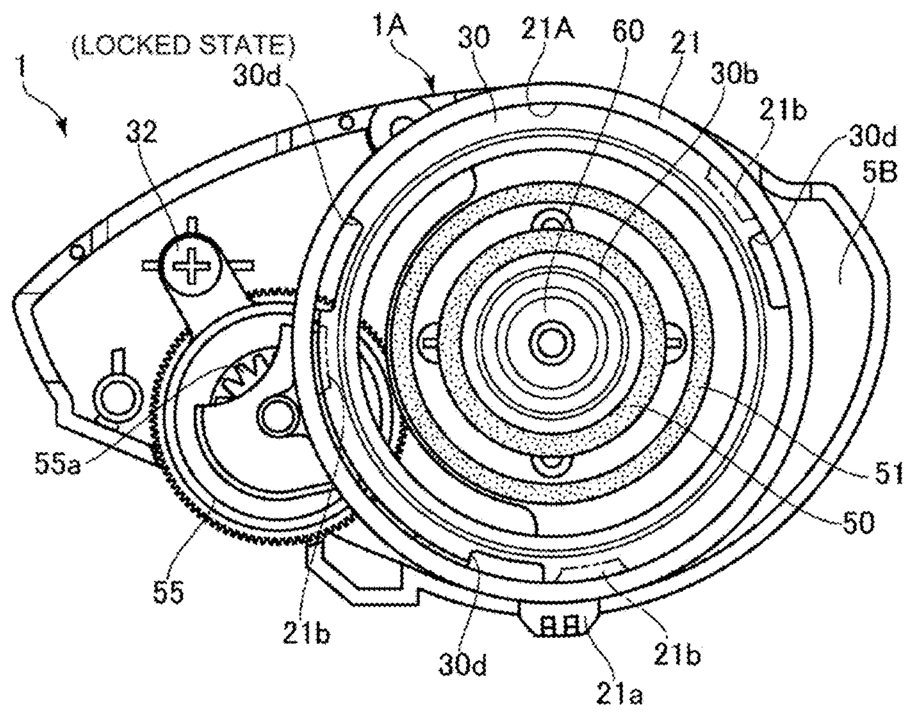
Figure 6B:
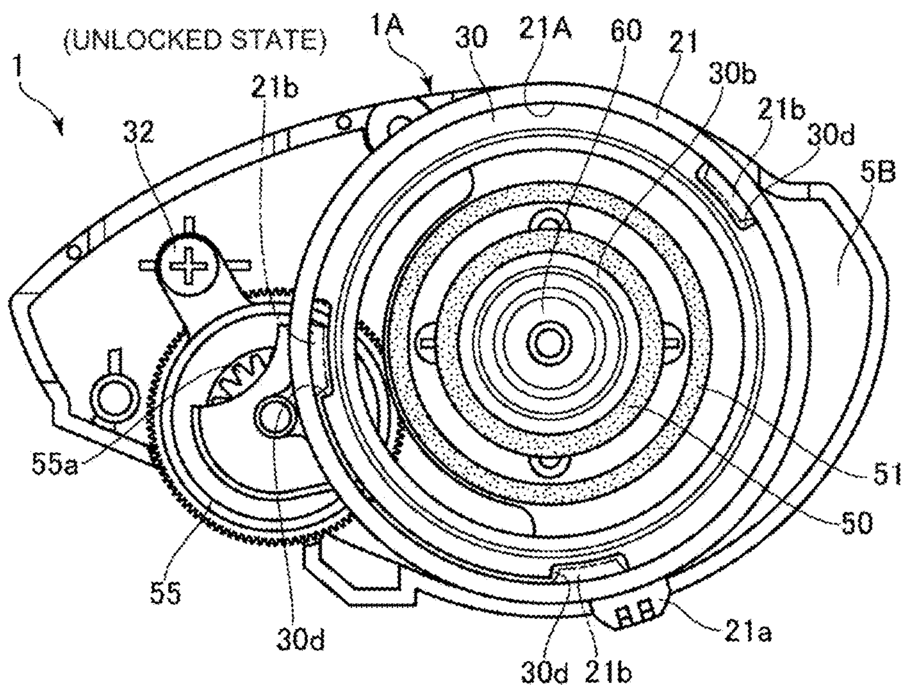

In this case, as illustrated in FIG. 5B, in the right side plate 5B, an inclined state 5B2 downward from the center C in a vertical direction can be made larger than an inclined state 5B1 upward from the center, so that the reel main body 1A can be made narrow (sharp) and the grasping property can be improved. In addition, since the engaging portions 23 are formed on the outer peripheral surface 30*a* of the set plate 30 and the locking portions 21*b* is provided inside of the ring-shaped opening and closing lever 21 in the radial direction, space efficiency can be improved and the reel main body can be downsized.

In addition, the opening and closing lever 21 of the opening and closing mechanism 20 is formed in a ring shape along the periphery of the opening through which the spool 6 is inserted and removed, and the operating part 21*a* is rotated, so that the space efficiency can be improved and the rotation operation can be stabilized because the operation can be performed along an arc-shaped locus.

Furthermore, when the right side plate 5B is detached from the right side portion 3B of the frame 3 by the opening and closing lever 21, the opening and closing lever 21 is exposed, so that maintainability can be improved.

The embodiments according to the present invention have been described above, but the present invention is not limited to the embodiments and may be modified in various ways. In the opening and closing mechanism 20 described above, the engaging portions 23 are provided on the outer peripheral surface of the set plate 30 of the right side plate 5B, but the engaging portions may be provided without providing the set plate on the right side plate 5B. Further, the shape of the moving member (opening and closing lever 21) may be any shape as long as it is movably held on the frame side, and the configuration of the locking portions 21*b* and the configuration of the engaging portions 23 can also be appropriately modified accordingly.

In the above embodiment, the engaging portion and the locking portion are provided at three locations. However, the number of the engaging portions and the structure for locking/releasing the engaging portions are not limited, and the engaging portions and the locking portions can be appropriately modified according to the shape, size, and the like of the reel main body. Further, in the case of a right handle type double bearing reel, similar opening and closing mechanisms 20 may be disposed on the left side plate 5A and the left side portion 3A.

What is claimed is:

1. A double-bearing reel comprising a reel main body with an opening and closing mechanism that allows a side plate to be opened and closed with respect to a frame, wherein the opening and closing mechanism comprises a moving member that is supported by the frame in a displaceable manner and comprises an operating part exposed from the reel main body and a locking portion, and an engaging portion on the side plate and engageable with and disengageable from the locking portion when the moving member is displaced by an operation of the operating part, and the moving member comprises an arc-shaped portion, and the locking portion is inside of the arc-shaped portion.

2. The double-bearing reel according to claim 1, wherein the moving member is formed in a ring shape formed in the frame and disposed along a periphery of an opening through which a spool is inserted.

3. A double-bearing reel comprising a reel main body with an opening and closing mechanism that allows a side plate to be opened and closed with respect to a frame, wherein the opening and closing mechanism comprises a moving member that is supported by the frame in a displaceable manner and comprises an operating part exposed from the reel main body and a locking portion, and an engaging portion on the side plate and engageable with and disengageable from the locking portion when the moving member is displaced by an operation of the operating part, the moving member comprises an arc-shaped portion, and the locking portion is inside of the arc-shaped portion, a set plate holding a backlash preventing device is attached to the side plate, and the engaging portion is formed on an outer peripheral surface of the set plate and is engaged with and disengaged from the locking portion formed inside of the arc-shaped portion.

4. The double-bearing reel according to claim 3, wherein the engaging portion has an annular groove formed on an outer periphery of the set plate.

5. A double-bearing reel comprising a reel main body with an opening and closing mechanism that allows a side plate to be opened and closed with respect to a frame, wherein the opening and closing mechanism comprises a moving member that is supported by the frame in a displaceable manner and comprises an operating part exposed from the reel main body and a locking portion, and an engaging portion on the side plate and engageable with and disengageable from the locking portion when the moving member is displaced by an operation of the operating part, and in the side plate, an inclined state downward from a center in a vertical direction is larger than an inclined state upward from the center.

* * * * *